Sept. 7, 1965 R. HORNE 3,204,462
DEVICE FOR MEASURING THE TEMPERATURE OF A RUNNING THREADLINE
Filed July 10, 1961
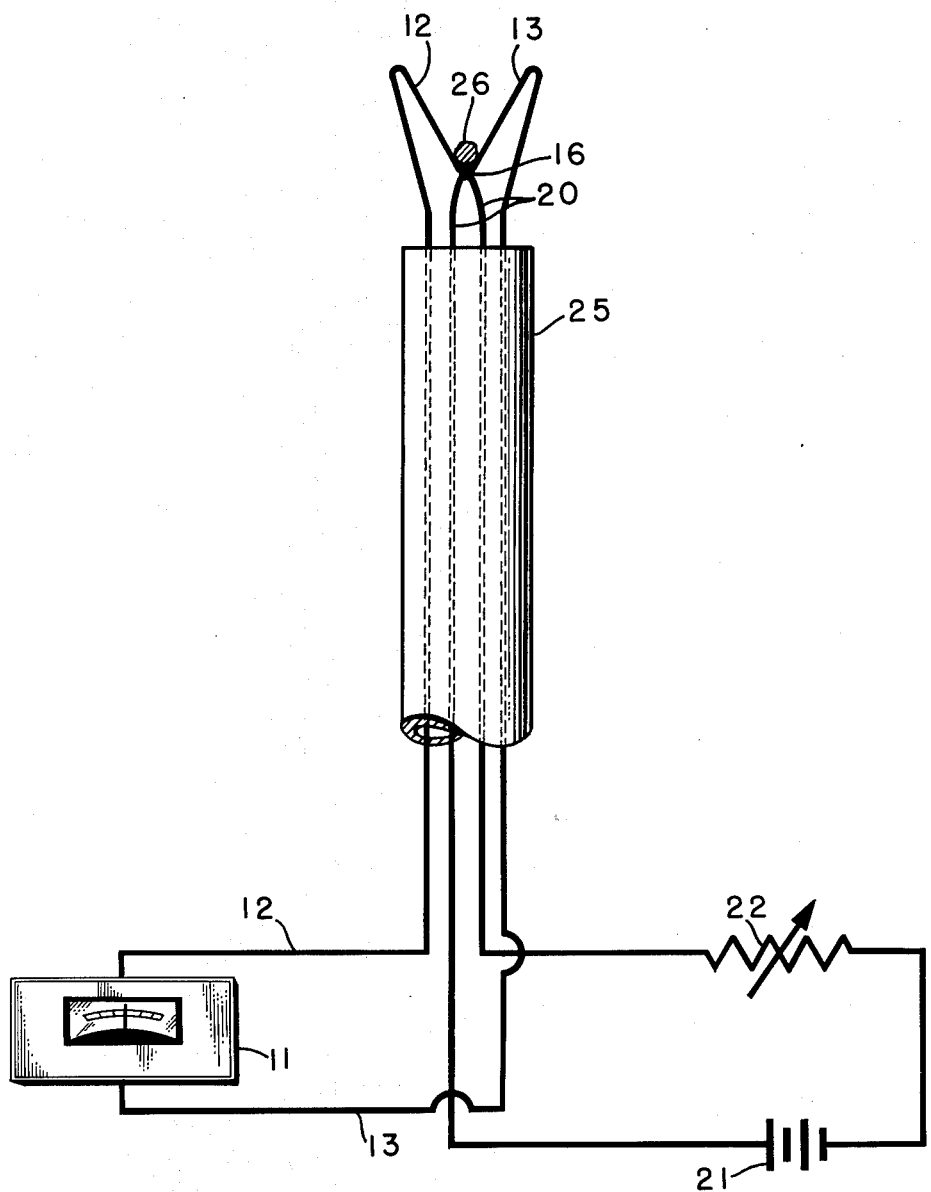
INVENTOR.
RONALD HORNE
BY
Robert L. Burdge
ATTORNEY 3,204,462
DEVICE FOR MEASURING THE TEMPERATURE OF A RUNNING THREADLINE
Ronald Horne, Pensacola, Fla., assignor, by mesne assignments, to Monsanto Company, a corporation of Delaware
Filed July 10, 1961, Ser. No. 122,737
7 Claims. (Cl. 73—359)

This invention relates to temperature measuring devices and, more particularly, to instruments for measuring the temperature of a running threadline.

In the manufacture of chemical fibers, it is common and usually essential that the filaments or fibers be heat treated at one or more stages of the manufacturing operation. Filaments or yarns are heated for the purpose of annealing, stretching, "relaxing," crimping, texturizing, etc. If the yarn is to be a commercial success, one or more of these operations is usually necessary.

Naturally, the heating operation cannot be carried out at just any temperature. For optimum results, the filament or yarn must be heated to a temperature within a narrow range, the range depending upon the particular chemical fiber being treated. If the yarn is heated to a temperature outside this range, the desired yarn characteristics will probably not be achieved.

One of the problems that has plagued manufacturers of chemical fibers is the fact that it has been extremely difficult to accurately measure the temperature of a moving yarn. For that reason, much heating of yarn has been a matter of guesswork and approximation. One of the objects of this invention is to overcome this problem by providing a novel and improved device for measuring the temperature of a moving threadline.

Another object of this invention is to provide an instrument for continuously and accurately indicating the temperature of a running threadline.

A further object of this invention is to provide a temperature measuring device wherein a thermocouple junction is heated to the temperature to be measured. Variations of the thermocouple E.M.F. are measured to indicate changes in the measured temperature.

Still another object of this invention is to provide a yarn temperature measuring instrument having a thermocouple to be placed in engagement with a moving yarn and a resistance heater for heating the thermocouple bead to the desired yarn temperature.

One embodiment of the present invention contemplates a yarn temperature measuring device wherein a thermocouple to be placed in contact with a moving threadline has its leads formed into a V shape to guide the yarn and to hold it in contact with the thermocouple junction or bead, the bead being at the apex of the V. A Nichrome wire spot welded to the thermocouple bead and connected to a battery is utilized to heat the thermocouple bead to a temperature which is the desired yarn temperature. Variations in the E.M.F. generated by the thermocouple indicate variations in the temperature of the moving yarn.

Other objects and advantages of the invention will become apparent when the following detailed description is read in conjunction with the drawing, in which the single figure is a schematic diagram of a circuit illustrating the principles of the invention.

Referring now in detail to the drawing, a temperature indicating device 11 of a well known type is shown connected through leads 12 and 13 to a thermocouple bead or junction 16. The bead or junction 16 is formed by spot welding the ends of the leads 12 and 13 together in a well known manner, the lead 12 being chromel and the lead 13 being alumel. The device or meter 11 measures the E.M.F. generated by the thermocouple and is calibrated to indicate the temperature of the bead or junction 16.

A Nichrome resistance wire 20 is spot welded to the junction 16 as shown in the drawing. A battery 21 is connected to the wire 20 to provide a current for heating the resistance wire to heat the thermocouple junction 16.

A variable resistor 22 connected in series with the battery 21 serves to adjust the voltage applied to the resistance wire 20 to thereby adjust the current flowing in this wire. Adjustment of the current flowing in the resistance wire 20 adjusts the temperature to which the junction 16 is heated. The thermocouple leads 12 and 13 and the resistance wire 20 are housed in a tube 25, the various wires being insulated from each other.

The thermocouple leads 12 and 13 extend from the junction 16 and diverge from each other to form a V-shaped yarn guide, with the junction 16 being at the apex of the V so that a yarn 26 passing through the V will engage and move across the junction 16. Chromel and alumel are used for the thermocouple for the reason that these alloys are more resistant to wear than are some other alloys commonly used in thermocouples.

In operation of the device, the variable resistor 22 is adjusted so that the current flowing in the Nichrome resistance wire 20 heats the thermocouple junction 16 to a temperature which is the temperature to which the threadline or yarn 26 is to be heated. When the variable resistor 22 is correctly adjusted, the meter 11 will read the temperature to which it is desired to heat the yarn. The moving yarn is then positioned in the V formed by the thermocouple leads 12 and 13.

The temperature of the yarn 26 will, if it varies from the desired value, change the reading indicated by the meter 11. If the yarn temperature is at the desired value, the yarn and the thermocouple junction 16 will be at the same temperature and the reading on the meter 11 will be unchanged.

If the yarn temperature is above the desired operating value, the yarn will increase the temperature of the junction 16 thereby causing the meter to show a higher reading, the higher reading being the actual temperature of the yarn. If the yarn temperature is below the desired operating value the yarn will be cooler than the junction 16 and will thereby receive heat from the junction. This will cause the thermocouple to generate a lower E.M.F. This will cause the meter 11 to show a reading lower than normal, this reading being the actual yarn temperature.

In short, there is no heat transfer from the yarn to the thermocouple junction 16 or vice versa when the yarn is at the desired temperature, since the yarn and the junction will be at the same temperature. If, however, the yarn temperature varies, there will be a small heat transfer to or from the thermocouple junction 16. This heat transfer will alter the reading of the meter 11 to show the actual temperature of the yarn.

In a conventional system, the temperature reading indicated by a measuring device depends on a heat transfer from the heated article to the thermocouple at all times. If the heat transfer is not efficient, the indicated temperature will be lower than the actual temperature of the heated article. Also, if the article is heated much above room temperature, there must be a high rate of heat transfer to obtain an accurate measurement. Since there is a time lag in transferring the amount of heat necessary to elevate the thermocouple junction to the temperature of the heated article, the conventional arrangement is not very accurate in measuring the temperature of a moving yarn. The present invention is not subject to these disadvantages.

The present invention does not depend upon a high rate of heat transfer for accuracy. In fact, under normal conditions, no heat transfer at all is required to or from the thermocouple to obtain an accurate indication of the temperature of the moving yarn. If the yarn temperature varies from the desired value, only a slight transfer of heat to or from the thermocouple junction is necessary to provide an accurate temperature measurement. This insures that the device is accurate.

It is to be understood that the embodiment disclosed herein may be modified or amended and that numerous other embodiments may be contemplated without departing from the spirit and scope of the invention.

What is claimed is:

1. A device for measuring the temperature of a moving article, comprising a thermocouple having a temperature sensing junction, means for heating said junction to a predetermined temperature, means associated with the thermocouple for guiding and holding the article in heat transfer relationship with said thermocouple and means for measuring the e.m.f. generated by the thermocouple.

2. A device for measuring the temperature of a moving strand, comprising a thermocouple having a junction for engaging the moving strand, a resistance wire secured to the junction, means connected to the resistance wire for passing an electrical current therethrough to heat said junction to a predetermined temperature, means associated with the thermocouple junction for guiding and holding the strand in heat transfer relationship with said junction, and means for meausring the e.m.f. generated by the thermocouple.

3. A device for measuring the temperature of a moving threadline, comprising a thermocouple having a junction for engaging the threadline and a pair of leads extending from the junction to define a threadline guide for holding the threadline in contact with the junction, means for heating the junction to the temperature of the threadline, and means connected to the thermocouple for indicating the temperature of the junction.

4. A device for measuring the temperature of a moving threadline comprising a thermocouple having a junction for engaging the threadline and a pair of leads extending from the junction to define a V-shaped threadline guide, a resistance wire secured to the junction, and means for passing an electrical current through the resistance wire to heat the junction to a predetermined temperature.

5. A device for measuring the temperature of a running threadline, comprising a thermocouple having a junction for engaging the threadline and a pair of leads diverging from the junction to form a V-shaped threadline guide, a resistance wire secured to the junction, means connected to the resistance wire for passing an electrical current therethrough for heating the thermocouple junction, means connected to the current passing means and the resistance wire for adjusting said current to vary the temperature to which the junction is heated, and means for indicating the temperature of the junction.

6. A device for measuring the temperature of a moving yarn, comprising a thermocouple having a junction for engaging the yarn and a pair of leads diverging from the junction to form a V-shaped yarn guide, a resistance wire secured to the junction, a battery connected to the resistance wire for passing an electrical current therethrough to heat the junction to the temperature to which the yarn is to be heated, a variable resistor connected in series with the battery and the resistance wire for adjusting said current to vary the temperature to which the junction is heated, and means for indicating the temperature of said junction.

7. A device for measuring the temperature of a running threadline, comprising a tube, a pair of lead wires extending through the tube and terminating in a thermocouple junction, said leads being curved into a configuration adapted to guide the running threadline into contact with the thermocouple junction, a resistance wire extending through the tube, said resistance wire being attached at a point thereon to the thermocouple junction, means connected to the resistance wire for applying a voltage thereto, and means connected to said wires for measuring the e.m.f. generated by the thermocouple junction.

References Cited by the Examiner

UNITED STATES PATENTS 2,947,171  8/60  Peltola _____ 73—362
2,949,721  8/60  Van Dijk _____ 28—62

OTHER REFERENCES

Review of Scientific Instruments, January 19, 1950, vol. 21, No. 1; pages 1–3 relied upon.

Journal of Scientific Instruments, November 1948, vol. 25; pages 378–383 relied upon.

ISAAC LISANN, *Primary Examiner.*